United States Patent
Ng

(10) Patent No.: US 6,704,832 B1
(45) Date of Patent: Mar. 9, 2004

(54) PERIPHERAL BUS JUMPER BLOCK FOR A CONFIGURABLE PERIPHERAL BUS INTERCONNECT SYSTEM

(75) Inventor: Yiu-Keung Ng, Monterey Park, CA (US)

(73) Assignee: StorCase Technology, Inc., Fountain Valley, CA (US)

(*) Notice: Subject to any disclaimer, the term of this patent is extended or adjusted under 35 U.S.C. 154(b) by 481 days.

(21) Appl. No.: 09/774,233

(22) Filed: Jan. 31, 2001

(51) Int. Cl.$^7$ ............................................... G06F 13/00
(52) U.S. Cl. ....................... 710/316; 710/300; 370/364; 361/686
(58) Field of Search ................................ 710/316, 107, 710/305, 300, 306; 439/43, 79; 713/300; 370/351, 364; 361/600, 686; 711/114

(56) References Cited

U.S. PATENT DOCUMENTS

| | | | |
|---|---|---|---|
| 5,740,386 A | * | 4/1998 | Miller et al. |
| 6,076,142 A | | 6/2000 | Corrington et al. ......... 711/114 |
| 6,148,356 A | * | 11/2000 | Archer et al. |
| 6,408,343 B1 | * | 6/2002 | Erickson et al. |

* cited by examiner

Primary Examiner—Gopal C. Ray
(74) Attorney, Agent, or Firm—Morland C. Fischer

(57) ABSTRACT

A peripheral bus jumper block that establishes an external peripheral bridge for linking independent peripheral bus signal paths (i.e., sets of electrical traces formed on a peripheral bus panel) of a peripheral bus interconnect system so that the signal paths have the functional equivalent of a single, continuous peripheral bus path. Accordingly, arrays of computer peripherals (e.g. disk drives) that are coupled to the peripheral bus signal paths within a peripheral device enclosure are chained together so as to be capable of being operated by the same computer controller, whereby the peripheral bus interconnect system can be selectively reconfigured to improve system flexibility. The peripheral bus jumper block has a pair of peripheral bus connectors that are detachably connected to respective peripheral bus connectors from a pair of the peripheral bus signal paths that are to be linked together.

17 Claims, 3 Drawing Sheets

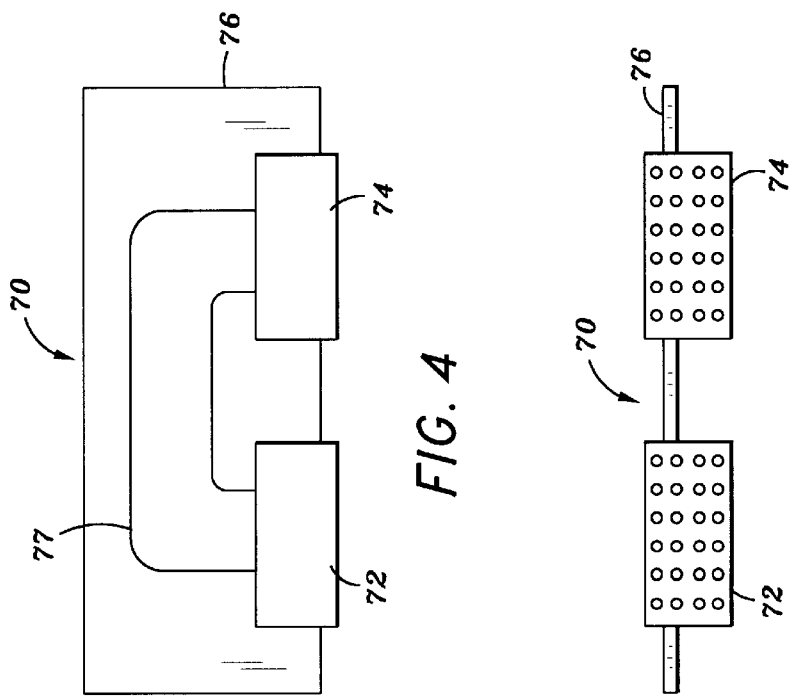
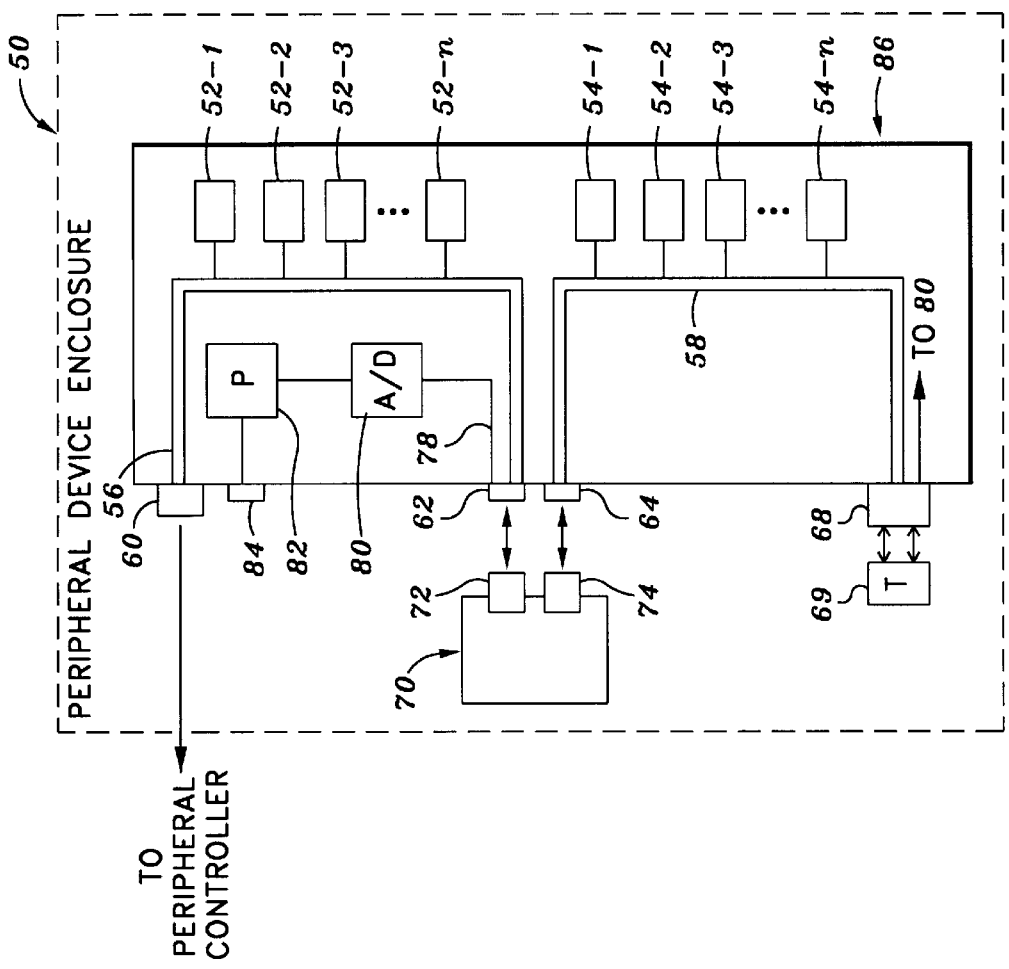

PERIPHERAL BUS JUMPER BLOCK FOR A CONFIGURABLE PERIPHERAL BUS INTERCONNECT SYSTEM

BACKGROUND OF THE INVENTION

1. Field of the Invention

This invention relates to a peripheral bus jumper block for linking independent peripheral bus signal traces on a peripheral bus panel to which different arrays of peripheral devices are respectively coupled within a peripheral device enclosure so that all of the peripheral devices can be chained together and operated from the same computer peripheral controller. By virtue of the foregoing, an end user will be able to selectively reconfigure the peripheral bus interconnect system after the peripheral device enclosure has left the manufacturer.

2. Background Art

As will be recognized by those skilled in the computer hardware field where one or more computers controls a plurality of computer peripherals, a peripheral bus interconnect system links the computers to different peripheral devices. The peripheral devices, such as a CD drive, a DVD drive, a hard disk drive, and the like, are commonly housed in a peripheral device enclosure. A typical peripheral bus system, such as that just described, is illustrated in FIG. 1 of the drawings, where a computer is shown interfaced with a single array of computer peripheral devices 3-1, 3-2, 3-3 . . . 3-n that are all housed within a single port peripheral device enclosure 5. The peripheral bus interconnect system includes first and second cable sections 7 and 9 that couple the computer 1 to the peripheral devices 3 within enclosure 5.

More specifically, the first cable section 7 of the peripheral bus interconnect system is detachably connected between an output peripheral bus connector 10 of the computer 1 and an input bus connector 12 of the peripheral device enclosure 5. The second cable section 9 of the peripheral bus interconnect system is internal to the peripheral bus enclosure 5 and runs between the input connector 12 thereof and a cable terminator 14. The cable terminator 14 is located at the end of cable section 9 either outside (as shown) or inside the enclosure 5. Each of the peripheral devices 3 is coupled to the internal cable section 9 (e.g., either directly or by way of bus transceivers). In the configuration illustrated in FIG. 1, the computer 1 has a single peripheral controller (not shown) by which each of the peripheral devices 3 that is located within the peripheral device enclosure 5 is operated to receive data and control signals by way of the first and second cable sections 7 and 9.

The difficulty with the peripheral bus interconnect system illustrated in FIG. 1 is that the end user can do little to reconfigure the cable section 9 within peripheral device enclosure 5 once the enclosure has left the manufacturer. Thus, all of the peripheral devices 3 that are coupled to the cable section 9 within enclosure 5 are driven by the same peripheral controller of the computer. The operation and control of all of the peripheral devices 3 from the same controller may not be desirable in all instances and, consequently, limits the flexibility of the peripheral device enclosure 5 within which the peripheral bus interconnect system is located.

To overcome the problem with the non-configurable system shown in FIG. 1, the peripheral bus interconnect system shown in FIG. 2 of the drawings has sometimes been adopted. In this case, a computer 20 is interfaced with first and second arrays of computer peripheral devices 23-1, 23-2, 23-3 . . . 23-n and 24-1, 24-2, 24-3 . . . 24-n that are housed within a dual port peripheral device enclosure 25. The arrays of peripheral devices 23 and 24 within peripheral device enclosure 25 are now interfaced with the computer by means of a pair of peripheral buses.

A first of the pair of peripheral buses having first and second cable sections 27 and 29 couples the computer 20 to the first array of peripheral devices 23 within enclosure 25. The first cable section 27 of the first peripheral bus is detachably connected between a first output peripheral bus connector 30 of computer 20 and a first input bus connector 32 of the dual port peripheral device enclosure 25, and the second cable section 29 is internal to the enclosure 25 and runs between input connector 32 and a cable terminator 34. Each of the peripheral devices 23 of the first array is coupled to the internal cable section 29.

The second of the pair of peripheral buses also has first and second cable sections 36 and 38 to couple the computer 20 to the second array of peripheral devices 24 within enclosure 25. The first cable section 36 of the second peripheral bus is detachably connected between a second output peripheral bus connector 40 of computer 20 and a second input bus connector 42 of the dual port peripheral device enclosure 25, and the second cable section 38 is internal to the enclosure 25 and runs between input connector 42 and a cable terminator 44. Each of the peripheral devices 24 of the second array is coupled to the internal cable section 38. The cable terminators 34 and 44 for the first and second peripheral buses of the peripheral bus interconnect system shown in FIG. 2 are, for example, located internally of the peripheral device enclosure 25.

In the configuration shown in FIG. 2, the computer 20 has a pair of peripheral controllers (not shown) by which to independently control the first and second arrays of peripheral devices 23 and 24 via the first and second peripheral buses which are independently connected to the first and second output peripheral bus connectors 30 and 40. In this same regard, it is also known to replace the computer 20 of FIG. 2 having a pair of peripheral controllers with a pair of computers (not shown), each having a single controller for selectively controlling the arrays of peripheral devices 23 and 24 via the respective first and second peripheral buses.

In either case, the use of the dual port peripheral device enclosure 25 of FIG. 2 to be interconnected to different peripheral controllers allows independent control of the first and second arrays of computer peripheral devices 23 and 24. Nevertheless, it is not possible to interrupt or link the cable sections 29 and 38 of the first and second peripherals buses located within enclosure 25 to which the different arrays of peripheral devices 23 and 24 are coupled. That is, the end user cannot reconfigure the peripheral bus interconnect system of FIG. 2 so as to be able to operate both arrays of peripheral devices 23 and 24 from the same peripheral controller.

SUMMARY OF THE INVENTION

Disclosed below is a peripheral bus jumper block to be used for linking independent peripheral bus signal paths (e.g., traces) from a peripheral bus interconnect system to which different arrays of computer peripheral devices are coupled so that all of the peripheral devices can be tied together and operated from the same computer controller. The arrays of peripheral devices are housed within a peripheral device enclosure. Each array of peripheral devices is coupled to a respective peripheral signal path that is formed on a peripheral bus panel within the enclosure.

The peripheral bus jumper block of this invention includes a pair of peripheral bus mating connectors that are carried on a printed circuit board having suitable linking circuitry. The mating connectors of the jumper block are adapted to be respectively connected to a pair of peripheral bus panel connectors that are accessible at the peripheral bus panel within the peripheral device enclosure and communicate with the independent signal paths to which a pair of arrays of peripheral devices are coupled. By connecting more than one jumper block to different pairs of peripheral bus panel connectors, a plurality of independent signal paths of the peripheral bus interconnect system can be quickly and easily chained together on the bus panel within the peripheral device enclosure so that different arrays of peripheral devices can be operated from the same computer controller. By virtue of the foregoing, the end user may effectively configure the peripheral bus interconnect system after the peripheral device enclosure has left the manufacturer to selectively operate any desired number of arrays of peripheral devices.

When a peripheral bus jumper block is connected to a pair of peripheral bus panel connectors, at least one pin connection therebetween carries a signal that is dedicated to providing an indication when the peripheral bus interconnect system is operating in a single segment mode, as described above. That is, the connection of the jumper block causes the dedicated signal to experience a decrease in voltage. An analog to digital converter is responsive to the voltage decrease to transmit a corresponding digital signal to a processor located within the peripheral device enclosure by which to indicate to an external computer the chaining of a pair of peripheral bus signal paths and the linking of the peripheral devices coupled thereto.

BRIEF DESCRIPTION OF THE DRAWINGS

FIG. 3 illustrates a peripheral bus interconnect system that is adapted to be selectively reconfigured by means of coupling one or more peripheral bus jumper blocks to corresponding pairs of bus panel connectors at a peripheral bus panel located within a peripheral device enclosure;

FIGS. 4 and 5 illustrate details of the peripheral bus jumper block by which to reconfigure the peripheral bus interconnect system of FIG. 3.

DETAILED DESCRIPTION

Figure 2:
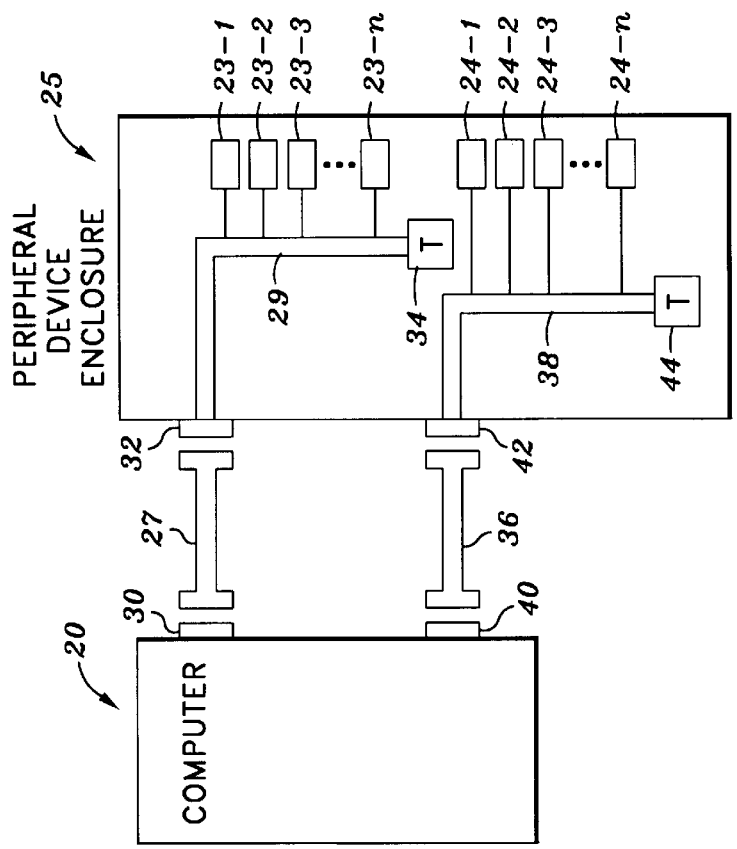
FIG. 2 illustrates a conventional peripheral bus interconnect system including a dual port peripheral device enclosure.
Figure 1:
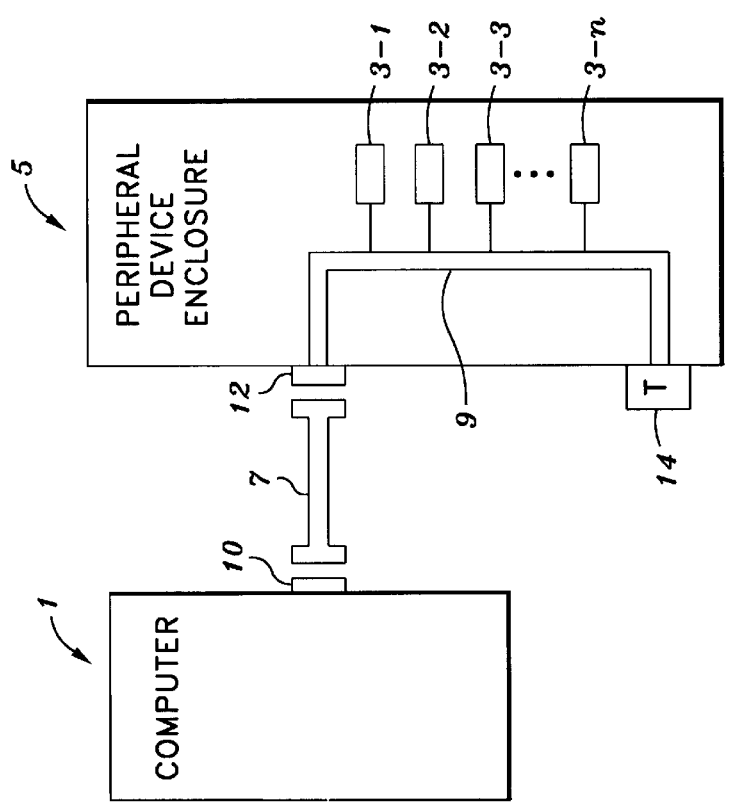
FIG. 1 illustrates a conventional peripheral device interconnect system including a single port peripheral device enclosure.

FIG. 3 of the drawings illustrates the means which forms the present improvement by which an end user can selectively reconfigure a peripheral bus interconnect system whereby to overcome the problems that are inherent with the non-reconfigurable peripheral bus configurations illustrated in FIGS. 1 and 2 so as to maximize system flexibility, performance capabilities and efficiency. More particularly, and as will soon be described, different arrays of computer peripheral devices like those described above when referring to FIGS. 1 and 2 that are housed within a peripheral device enclosure can now be operated from the same computer controller. FIG. 3 illustrates a peripheral device enclosure 50 in which two arrays of peripheral devices 52-1, 52-2, 52-3 . . . 52-n and 54-1, 54-2, 54-3 . . . 54-n are shown. However, the showing of only two arrays of peripheral devices 52 and 54 is for purposes of convenience only, and it is to be understood that any suitable number of arrays of peripheral devices may be located within enclosure 50 depending upon application.

A first peripheral bus path 56 (i.e., preferably a plurality of electrical signal traces) is formed on a peripheral bus panel (designated 86 in FIG. 6) that is housed within the peripheral device enclosure 50. Bus path 56 runs from an input peripheral bus connector 60 to an output peripheral bus connector 62. Each of the peripheral devices 52 of the first array is coupled to bus path 56. A second peripheral bus path 58, which is independent of path 56 and formed on the peripheral bus panel 86 of FIG. 6 extends from an input peripheral bus connector 64 to an output peripheral bus connector 68 that is detachably connected to a terminator 69. Each of the peripheral devices 54 of the second array is coupled to bus path 58.

In accordance with the present invention, when it is desirable to place the peripheral bus interconnect system in a single segment mode whereby to control the first and second arrays of peripheral devices 52 and 54 from the same computer peripheral controller, a peripheral bus jumper block 70 is provided by which to chain the first and second peripheral bus paths 56 and 58 together so as to effectively link all of the peripheral devices 52 and 54 together. Accordingly, two (or more) peripheral bus paths 56 and 58 can be tied together to create one continuous bus running from the input peripheral bus connector 60 to the output peripheral bus connector 68. Although only a single jumper block 70 is shown in FIG. 3 to chain a pair of peripheral bus paths 56 and 58, it is to be understood that any number of additional jumper blocks can also be employed (in the manner illustrated in FIG. 6) depending upon the number of separate bus paths to be linked together and the number of peripheral device arrays within a peripheral device enclosure that are to be operated from the same computer controller. When the jumper block 70 is removed, the peripheral bus interconnect system is returned to its normal dual segment mode having independent bus paths 56 and 58.

Details of the peripheral bus jumper block 70 by which to reconfigure a peripheral bus interconnect system by linking independent peripheral bus paths together are described while referring FIGS. 4 and 5 of the drawings. The peripheral bus jumper block 70 includes a pair of peripheral bus mating connectors 72 and 74 that are carried on a section of printed circuit board 76. The printed circuit board 76 contains a set 77 of electrical signal traces etched thereon by which peripheral bus mating connectors 72 and 74 are electrically coupled to one another. Circuit board 76 may also include electrical power traces. In the example illustrated in FIGS. 4 and 5, the mating connectors 72 and 74 of peripheral bus jumper block 70 are female connectors.

The peripheral bus mating connectors 72 and 74 of peripheral bus jumper block 70 are sized and positioned on printed circuit board 76 so as to be respectively and detachably connected to the peripheral bus panel connectors 62 and 64 (best shown in FIG. 3) that are accessible at the peripheral bus panel 86 (of FIG. 6) within the peripheral device enclosure 50. In the present example, each of the bus panel connectors 62 and 64 of the bus panel 86 is a male connector so that the contact pins thereof will be received by corresponding receptacles within the female mating connectors 72 and 74 of jumper block 70.

Accordingly, the two normally independent peripheral bus paths 56 and 58 on the bus panel 86 within the peripheral device enclosure 50 can be quickly and easily chained together by means of connecting the peripheral bus jumper block 70 to the peripheral bus panel connectors 62 and 64 to which bus paths 56 and 58 are connected. As previously disclosed, and as will soon be explained in greater detail when referring to FIG. 6, more than one peripheral bus jumper block 70 can be used to chain together a plurality of peripheral bus paths whereby different arrays of computer peripheral devices are all adapted to be coupled to a single computer peripheral controller via input peripheral bus panel connector 60.

By virtue of the foregoing, the end user may effectively reconfigure the peripheral bus interconnect system of FIG. 3 so as to selectively chain together peripheral bus paths 56 and 58 without altering the peripheral bus panel 6 or the peripheral device enclosure 50 or breaking the signal runs therein. For example, multiple disk drive buses can be reconfigured to operate in parallel in disk array applications by removing appropriate ones of the jumper blocks so as to increase system performance. Thus, the end user will not be required to scrap the original peripheral device enclosure or purchase different peripheral bus panels for different applications.

When a peripheral bus jumper block 70 is connected to a pair of peripheral bus panel connectors 62 and 64 as shown in FIG. 3, at least one pin connection 78 between the mating connectors 72 or 74 and the bus panel connectors 62 or 64 carries a voltage signal that is dedicated to providing an indication when peripheral bus paths 56 and 58 have been bridged together such that the peripheral bus interconnect system is now operating in a single segment mode. More particularly, the coupling connection of jumper block 70 causes the voltage of the dedicated signal to be decreased on pin 78 to represent a logic level O. An analog to digital converter 80 located within peripheral device enclosure 50 is responsive to the voltage on pin 78 to cause a corresponding digital control signal to be transmitted to a processor 82 which reads the signal to determine how the peripheral bus traces 56 and 58 are configured. The processor 82 communicates with the external computer controller at a serial data connector 84 so that the controller will be conditioned for single segment mode operation when peripheral bus jumper block 70 is connected in the manner shown in FIG. 3

Figure 6:
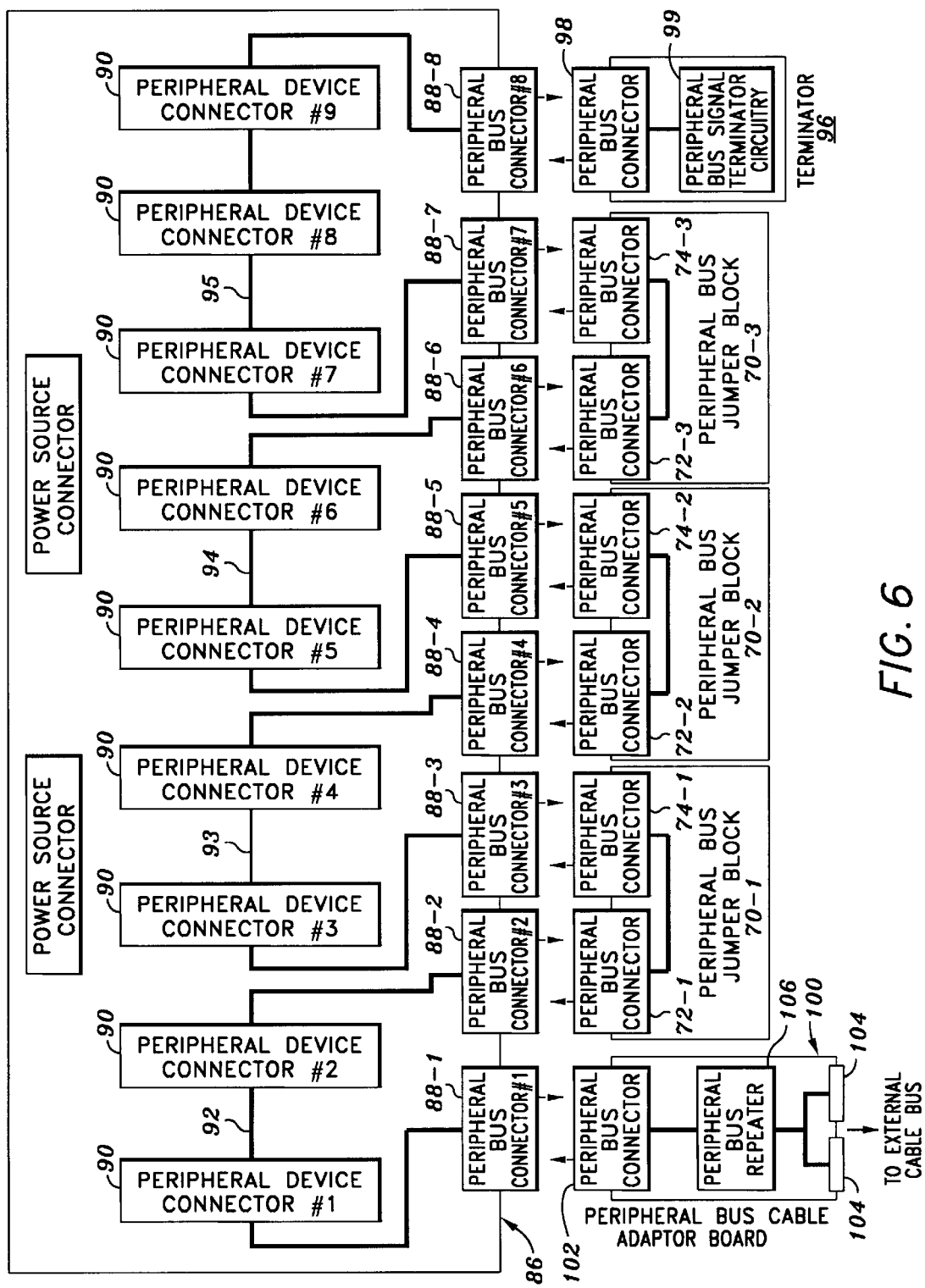
FIG. 6 is a block diagram representing a single channel configurable peripheral bus panel which incorporates a plurality of the peripheral bus jumper blocks of FIGS. 4 and 5.

Turning now to FIG. 6 of the drawings, there is shown a single channel configurable peripheral bus panel 86 which incorporates a plurality of the peripheral bus jumper blocks 70 as described when referring to FIGS. 4 and 5. Bus panel 86 has particular application for use in a disk drive storage enclosure (e.g. such as that designated 50 in FIG. 3). In the case of the single channel bus panel 86 of FIG. 6, a total of eight peripheral bus panel connectors 88-1 . . . 88-8 are shown in relation to a total of nine peripheral device connectors 90. The number of peripheral bus panel connectors 88 and peripheral device connectors 90 shown on bus panel 86 are for purposes of example only. Therefore, in the configuration of FIG. 6, a total of three peripheral bus jumper blocks 70-1, 70-2 and 70-3 are employed.

The peripheral bus mating connectors 72-1 and 74-1 of a first jumper block 70-1 are respectively connected to peripheral bus panel connectors 88-2 and 88-3, whereby to establish an external peripheral bus bridge to link a pair of peripheral bus signal paths 92 and 93. The peripheral bus mating connectors 72-2 and 74-2 of a second jumper block 70-2 are respectively connected to peripheral bus connectors 88-4 and 88-5, whereby to establish an extended peripheral bridge to link a pair of peripheral bus signal paths 93 and 94. Lastly, the peripheral bus mating connectors 72-3 and 74-3 of the third jumper block 70-3 are respectively connected to peripheral bus connectors 88-6 and 88-7, whereby to establish an external peripheral bridge to link a pair of peripheral signal paths 94 and 95. Accordingly, the normally separated signal traces 92-95 to which the peripheral devices are coupled by peripheral device connectors 90 are efficiently and reliably bridged together to be the functional equivalent of a single continuous peripheral signal path.

To terminate the peripheral bus channel of the single channel peripheral bus panel 86, a terminator 96 is connected to the last peripheral bus path connector 88-8 on bus panel 86 by means of a peripheral bus mating connector 98 that is similar to the peripheral bus connectors 72 and 74 of jumper block 70. Terminator 96 includes conventional peripheral bus terminator circuitry 99 that is common to non-configurable peripheral bus panels without the benefit of the present invention.

Finally, a peripheral adapter bus cable board 100 having a peripheral bus mating connector 102 is connected to the single channel peripheral bus panel 86 at the first peripheral bus path connector 88-1 and to one end of the peripheral bus channel thereof, whereby to establish an external bridge to link peripheral bus signal trace 92 and a pair of external cable connectors 104 for use in mating with external bus cables (not shown). The peripheral adapter board 100, as shown, includes an optional peripheral bus repeater circuitry 1b6 that provides retiming and amplification of peripheral bus signals.

It can be appreciated that the single channel peripheral bus panel 86 shown in FIG. 6 can be easily expanded to 2 and 4-channel peripheral bus panels depending upon application and the corresponding number of peripheral bus signal traces (i.e. channels) to be bridged together. In any case, the flexibility and performance of a peripheral bus interconnect system will be significantly enhanced by virtue of the peripheral bus jumper block 70 and the ability to selectively reconfigure the peripheral bus interconnect system in the manner that has been described above.

I claim:

1. For a peripheral bus interconnect system to be interfaced with a computer and including at least first and second independent peripheral bus signal paths, each of the first and second peripheral bus signal paths having an input and an output peripheral bus connector, and at least one computer peripheral device coupled to each of the first and second peripheral bus signal paths, the improvement comprising a peripheral bus jumper block having a pair of peripheral bus connectors to be respectively mated to the output peripheral bus connector of the first peripheral bus signal path and the input peripheral bus connector of the second peripheral bus signal path, whereby to link said first and second peripheral bus signal paths together so as to be the functional equivalent of a single, continuous peripheral bus signal path, whereby each of the computer peripheral devices coupled to said first and second peripheral bus signal paths can be operated by the computer to which the peripheral bus interconnect system is interfaced.

2. For the peripheral bus interconnect system recited in claim 1, the additional improvement comprising a bus terminator having a peripheral bus connector to be detachably connected to the output peripheral bus connector of the second peripheral bus signal path.

3. For the peripheral bus interconnect system recited in claim 1, the additional improvement comprising a peripheral bus cable adapter board having a peripheral bus connector to be detachably connected to the input peripheral bus connector of the first peripheral bus signal path and an external cable connector electrically connected to said peripheral bus connector of said adapter board and adapted to be mated to an external bus cable.

4. For the peripheral bus interconnect system recited in claim 3, the additional improvement comprising a peripheral bus repeater circuitry electrically connected between said peripheral bus connector and said external cable connector of said peripheral bus cable adapter board to provide timing and amplification of peripheral bus signals applied to said external cable connector when said external cable connector of said peripheral bus cable adapter board is mated to an external bus cable.

5. For the peripheral bus interconnect system recited in claim 1, wherein said pair of peripheral bus connectors of said peripheral bus jumper block are carried on a printed circuit board and a set of electrical signal traces are etched on said printed circuit board by which to electrically connect said pair of peripheral bus connectors to one another and thereby establish an external peripheral bridge to link said first and second peripheral bus signal paths together.

6. For the peripheral bus interconnect system recited in claim 1, the additional improvement comprising means to generate a signal in response to the mating of the pair of peripheral bus connectors of said peripheral bus jumper block to the output peripheral bus connector of the first peripheral bus signal path and the input peripheral bus connector of the second peripheral bus signal path so as to indicate to the computer to which the peripheral bus interconnect system is to be interfaced that the first and second peripheral bus signal paths have been linked together.

7. For the peripheral bus interconnect system recited in claim 6, wherein the signal generated when the first and second peripheral bus signal paths are linked together is a voltage.

8. For the peripheral bus interconnect system recited in claim 7, the additional improvement comprising an analog to digital converter to receive the voltage generated when the first and second peripheral bus signal paths are linked together and to generate a digital representation of said voltage to be supplied to the computer to which the peripheral bus interconnect system is to be interfaced.

9. For the peripheral bus interconnect system recited in claim 1, the additional improvement comprising a peripheral bus panel on which said first and second peripheral bus signal paths are carried and a peripheral device enclosure in which to house said peripheral bus panel and said at least one computer peripheral device that is coupled to each of said first and second peripheral bus signal paths.

10. For the peripheral bus interconnect system recited in claim 9, wherein each of said first and second signal paths are respective first and second sets of electrical signal traces formed on said peripheral bus panel that is housed within said peripheral device enclosure.

11. In combination:
a peripheral bus panel having at least first and second electrically independent signal paths of a peripheral bus interconnect system by which to connect first and second arrays of computer peripheral devices that are respectively coupled to said first and second signal paths to a computer controller;
a peripheral bus jumper block detachably connected to said first and second signal paths by which to link said signal paths together so as to have the functional equivalent of a single continuous signal path, whereby each of the first and second arrays of computer peripheral devices respectively coupled to said first and second signal paths is connected together and adapted to be operated by the computer controller; and
a peripheral device enclosure within which to house said peripheral bus panel and the first and second arrays of computer peripheral devices that are respectively coupled to said first and second signal paths of said peripheral bus panel.

12. For a peripheral bus interconnect system to be interfaced with a computer and including at least first and second independent peripheral bus signal paths, at least one computer peripheral device coupled to each of the first and second peripheral bus signal paths, an output peripheral bus connector coupled to said first peripheral bus signal path and an input peripheral bus connector coupled to said second peripheral bus signal path, the improvement comprising a peripheral bus jumper block detachably connected between the output peripheral bus connector of said first peripheral bus signal path and the input peripheral bus connector of said second peripheral bus signal path in order to establish an external peripheral bridge to link said first and second peripheral bus signal paths together so as to be the functional equivalent of a single, continuous peripheral bus signal path, whereby each of the computer peripheral devices coupled to said first and second peripheral bus signal paths can be operated by the computer to which the peripheral bus interconnect system is interfaced.

13. For the peripheral bus interconnect system recited in claim 12, wherein said peripheral bus jumper block has a pair of peripheral bus connectors to be respectively and removably attached to the output peripheral bus connector of the first peripheral bus signal path and to the input peripheral bus connector of the second peripheral bus signal path, whereby to establish said external peripheral bridge and thereby link said first and second peripheral bus signal paths together to form a continuous signal path.

14. For the peripheral bus interconnect system recited in claim 13, wherein said pair of peripheral bus connectors of said peripheral bus jumper block are carried on a printed circuit board and a set of electrical signal traces are etched on said printed circuit board by which to electrically connect said pair of peripheral bus connectors to one another and thereby establish said external peripheral bridge to link said first and second peripheral bus signal paths together.

15. For the peripheral bus interconnect system recited in claim 13, the additional improvement comprising means to generate a voltage in response to the removable attachment of the pair of peripheral bus connectors of said peripheral bus jumper block to the output peripheral bus connector of the first peripheral bus signal path and the input peripheral bus connector of the second peripheral bus signal path so as to indicate to the computer to which the peripheral bus interconnect system is to be interfaced that the first and second peripheral bus signal paths have been linked together.

16. For the peripheral bus interconnect system recited in claim 15, the additional improvement comprising an analog to digital converter to receive the voltage generated when the first and second peripheral bus signal paths are linked together and to generate a digital representation of said voltage to be supplied to the computer to which the peripheral bus interconnect system is to be interfaced.

17. For the peripheral bus interconnect system recited in claim 12, the additional improvement comprising a peripheral bus panel on which said first and second peripheral bus signal paths are carried and a peripheral device enclosure in which to house said peripheral bus panel and said at least one computer peripheral device that is coupled to each of said first and second peripheral bus signal paths.

* * * * *